(12) United States Patent
Kim

(10) Patent No.: US 12,092,177 B2
(45) Date of Patent: Sep. 17, 2024

(54) BRAKE APPARATUS FOR VEHICLE

(71) Applicant: HYUNDAI MOBIS CO., LTD., Seoul (KR)

(72) Inventor: Hyeong Sik Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 187 days.

(21) Appl. No.: 17/410,362

(22) Filed: Aug. 24, 2021

(65) Prior Publication Data
US 2022/0065314 A1 Mar. 3, 2022

(30) Foreign Application Priority Data

Aug. 25, 2020 (KR) .................. 10-2020-0107114

(51) Int. Cl.
| | | |
|---|---|---|
| F16D 65/18 | (2006.01) | |
| F16D 65/097 | (2006.01) | |
| F16D 121/24 | (2012.01) | |
| F16D 125/06 | (2012.01) | |
| F16D 125/08 | (2012.01) | |
| F16D 125/40 | (2012.01) | |

(52) U.S. Cl.
CPC ......... *F16D 65/18* (2013.01); *F16D 65/0979* (2013.01); *F16D 2121/24* (2013.01); *F16D 2125/06* (2013.01); *F16D 2125/08* (2013.01); *F16D 2125/40* (2013.01)

(58) Field of Classification Search
CPC .. F16D 65/18; F16D 65/0979; F16D 2121/24; F16D 2125/06; F16D 2125/08; F16D 2125/40
See application file for complete search history.

(56) References Cited

U.S. PATENT DOCUMENTS

| | | | | |
|---|---|---|---|---|
| 4,371,059 A | * | 2/1983 | Seki | ........................ F16D 65/54 188/196 P |
| 9,850,971 B1 | * | 12/2017 | Demorais | ............... F16D 65/18 |
| 2017/0321771 A1 | * | 11/2017 | Lee | ........... F16D 65/18 |
| 2018/0298963 A1 | * | 10/2018 | Demorais | ............. F16D 55/225 |
| 2022/0163076 A1 | * | 5/2022 | Fawcett | ................... F16D 65/18 |
| 2022/0316539 A1 | * | 10/2022 | Smith | ..................... F16D 65/18 |

FOREIGN PATENT DOCUMENTS

KR 10-1511437 B1 4/2015

* cited by examiner

*Primary Examiner* — Nicholas J Lane
(74) *Attorney, Agent, or Firm* — Morgan, Lewis & Bockius LLP

(57) ABSTRACT

A brake apparatus for a vehicle may include: a brake pad configured to press a brake disk; a screw bar located in a caliper body, and rotatable by power received from a motor unit; a spindle linearly movable by rotation of the screw bar, and coupled to the brake pad; a piston coupled to the spindle so as to cover an outside of the spindle, made of a material having lower hardness than that of the spindle, and movable with the spindle; and a sealing member installed in the caliper body, and contacting the piston.

7 Claims, 11 Drawing Sheets

BRAKE APPARATUS FOR VEHICLE

CROSS-REFERENCE TO RELATED APPLICATION

This application claims the benefit under 35 U.S.C. § 119(a) of Korean Patent Application No. 10-2020-0107114 filed on Aug. 25, 2020 in the Korean Intellectual Property Office, the entire disclosure of which is incorporated herein by reference for all purposes.

BACKGROUND

Field

Exemplary embodiments of the present disclosure relate to a brake apparatus for a vehicle, and more particularly, to a brake apparatus for a vehicle, which can prevent the generation of not only rattle noise but also drag torque.

Discussion of the Background

In general, an EPB (Electronic Parking Brake) of a vehicle presses a piston by converting a rotational force of a driving motor into a linear motion by using a screw and nut mechanism. The pressed piston presses a brake pad as a friction member against a wheel disk, thereby generating a braking force.

In the related art, the relative motions of the nut, the piston and the brake pad may generate rattle noise and drag torque. Therefore, there is a need for a device capable of solving the problem.

The related art of the present disclosure is disclosed in Korean Patent No. 10-1511437 entitled "Electro Mechanical Brake Apparatus" and registered on Apr. 6, 2015.

SUMMARY

Various embodiments are directed to a brake apparatus for a vehicle, which can prevent the generation of not only rattle noise but also drag torque.

In an embodiment, a brake apparatus for a vehicle may include: a brake pad configured to press a brake disk; a screw bar located in a caliper body, and rotatable by power received from a motor unit; a spindle linearly movable by rotation of the screw bar, and coupled to the brake pad; a piston coupled to the spindle so as to cover an outside of the spindle, made of a material having lower hardness than that of the spindle, and movable with the spindle; and a sealing member installed in the caliper body, and contacting the piston.

The spindle may include: a spindle body engaged and coupled to the screw bar, linearly moved by the rotation of the screw bar, and having an outer surface covered by the piston; a spindle contact part connected to the spindle body, and contacting the brake pad; and a coupling part configured to couple the spindle contact part and the brake pad.

The spindle body may have a serration part formed on an outer surface thereof.

The piston may include: a first piston portion coupled to the spindle body; and a second piston portion connected to the first piston portion coupled to the spindle body, and having an outer diameter smaller than an outer diameter of the first piston portion. A boot coupling groove may be formed by a level difference between the first piston portion and the second piston portion.

The brake apparatus may further include a boot part mounted on the caliper body and coupled to the boot coupling groove.

The brake apparatus may further include a boost part mounted on the caliper body and coupled to the boost coupling groove.

The brake pad may include: a back plate coupled to the spindle contact part by the coupling part; and a friction member coupled to the back plate.

The back plate may have a first coupling hole to which the coupling part is screwed, and the spindle contact part may have a second coupling hole which faces the first coupling hole and to which the coupling part is screwed.

The first coupling hole may be formed in a center of the back plate, and the friction member may have a coupling groove formed in a portion facing the center of the back plate.

The piston may have a rounded corner which is contacting the spindle contact part, and an O-ring may be inserted between the rounded corner and the spindle contact part.

The piston may have an O-ring coupling groove formed at a portion contacting the spindle contact part, and an O-ring may be inserted into the O-ring coupling groove.

In the brake apparatus for a vehicle in accordance with the embodiment of the present disclosure, the piston may be made of a material having lower hardness than the material of the spindle. Thus, the entire weight of the piston and the spindle may be reduced, which makes it possible to not only prevent the generation of rattle noise, but also reduce a power loss of the motor unit.

Furthermore, as the spindle and the brake pad are coupled, the brake pad may be completely separated from the brake disk, when a braking force is released, which makes it possible to prevent the generation of drag torque.

DETAILED DESCRIPTION OF THE ILLUSTRATED EMBODIMENTS

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
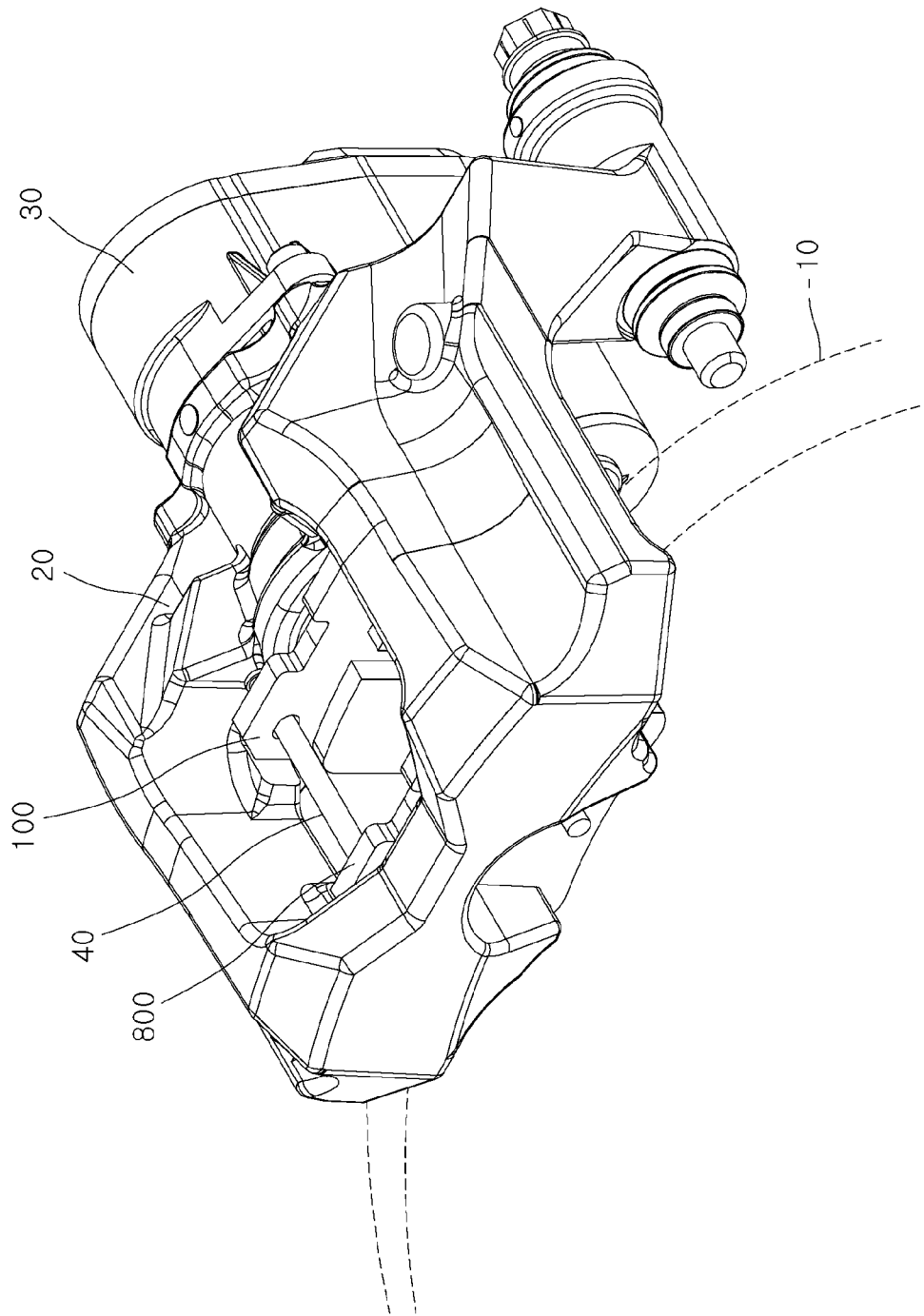
FIG. 1 is a perspective view illustrating a brake apparatus for a vehicle in accordance with an embodiment of the present disclosure.
Figure 2:
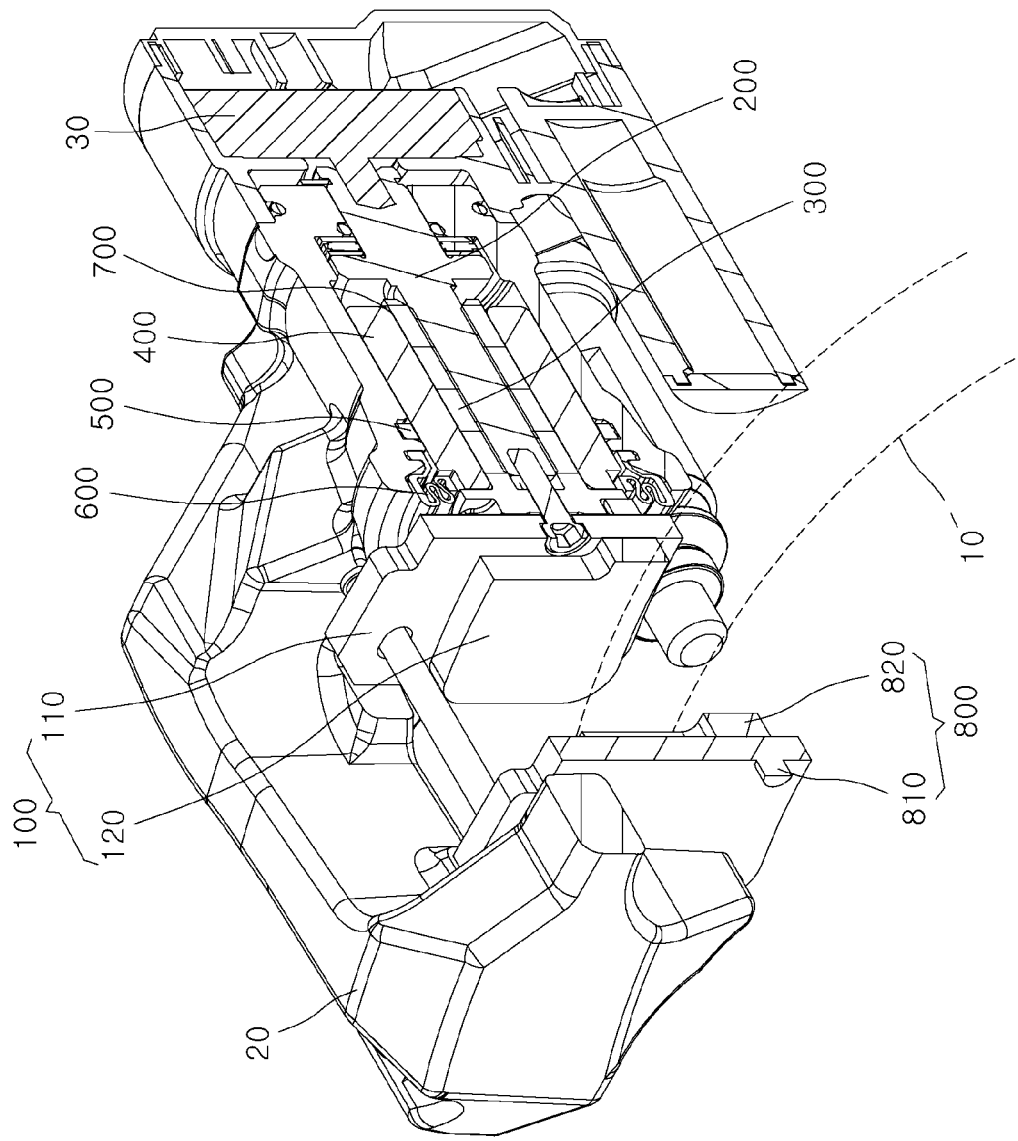
FIG. 2 is a cross-sectional perspective view illustrating the brake apparatus for a vehicle in accordance with the embodiment of the present disclosure.
Figure 3:
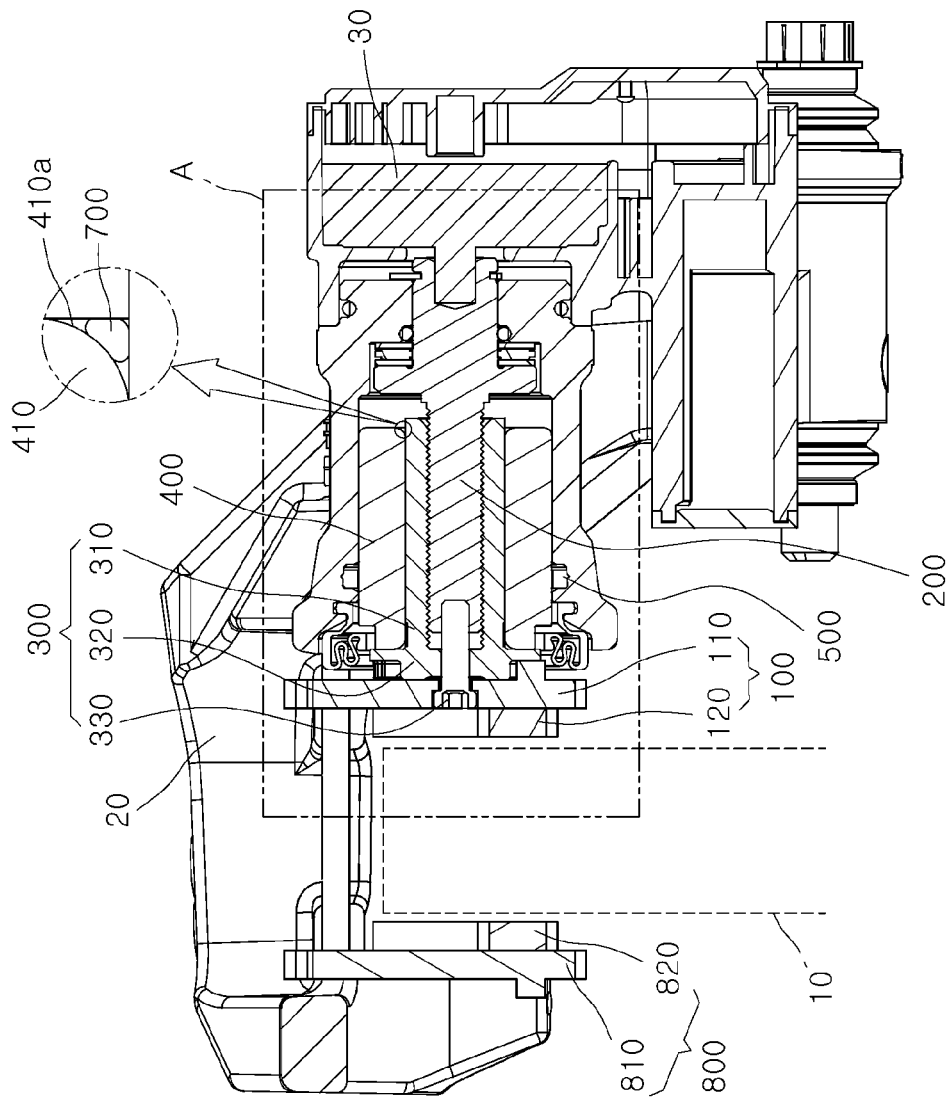
FIG. 3 is a cross-sectional view illustrating the brake apparatus for a vehicle in accordance with the embodiment of the present disclosure.
Figure 4:
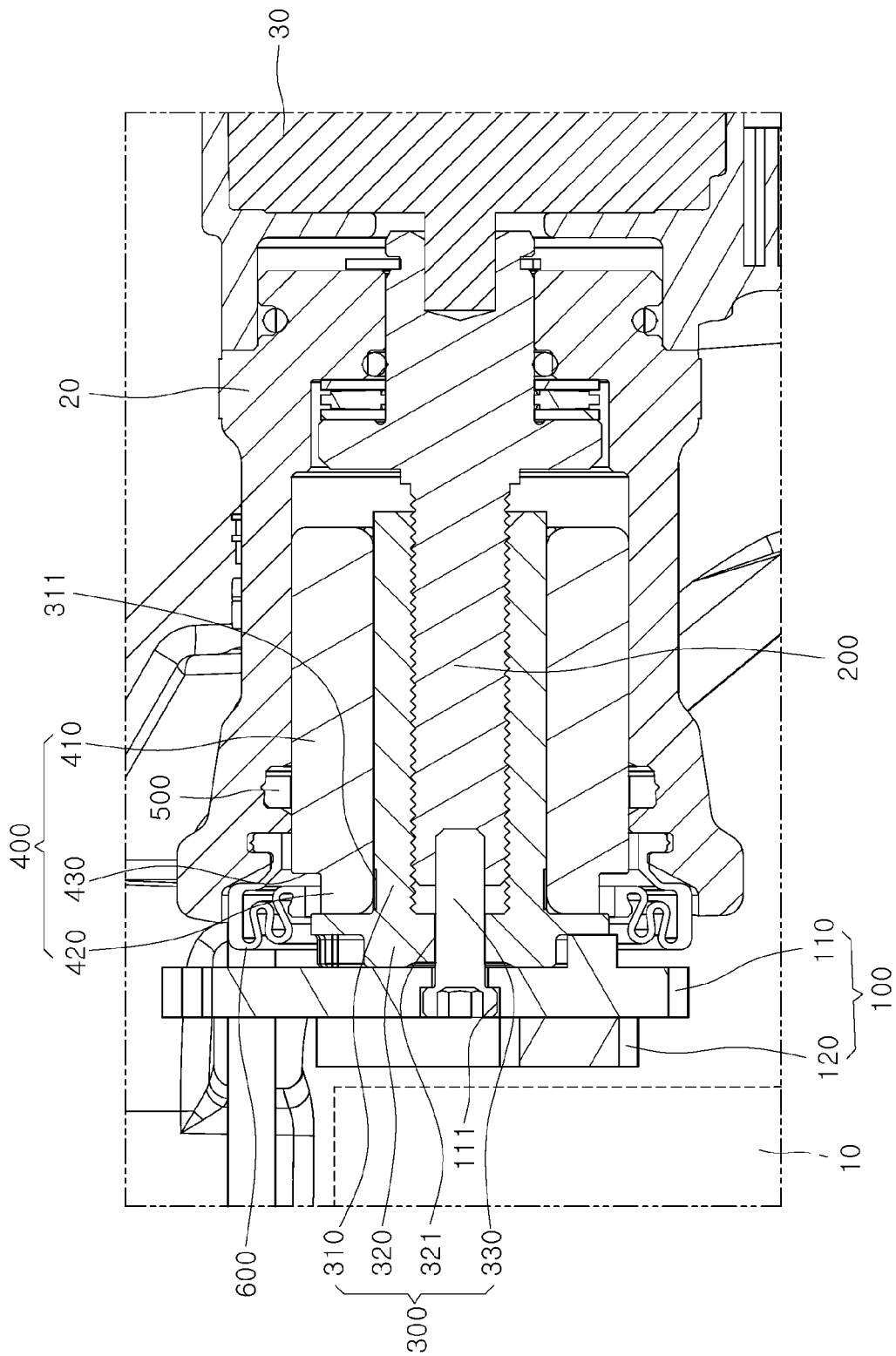
FIG. 4 is an expanded view of a portion A of FIG. 3.
Figure 5:
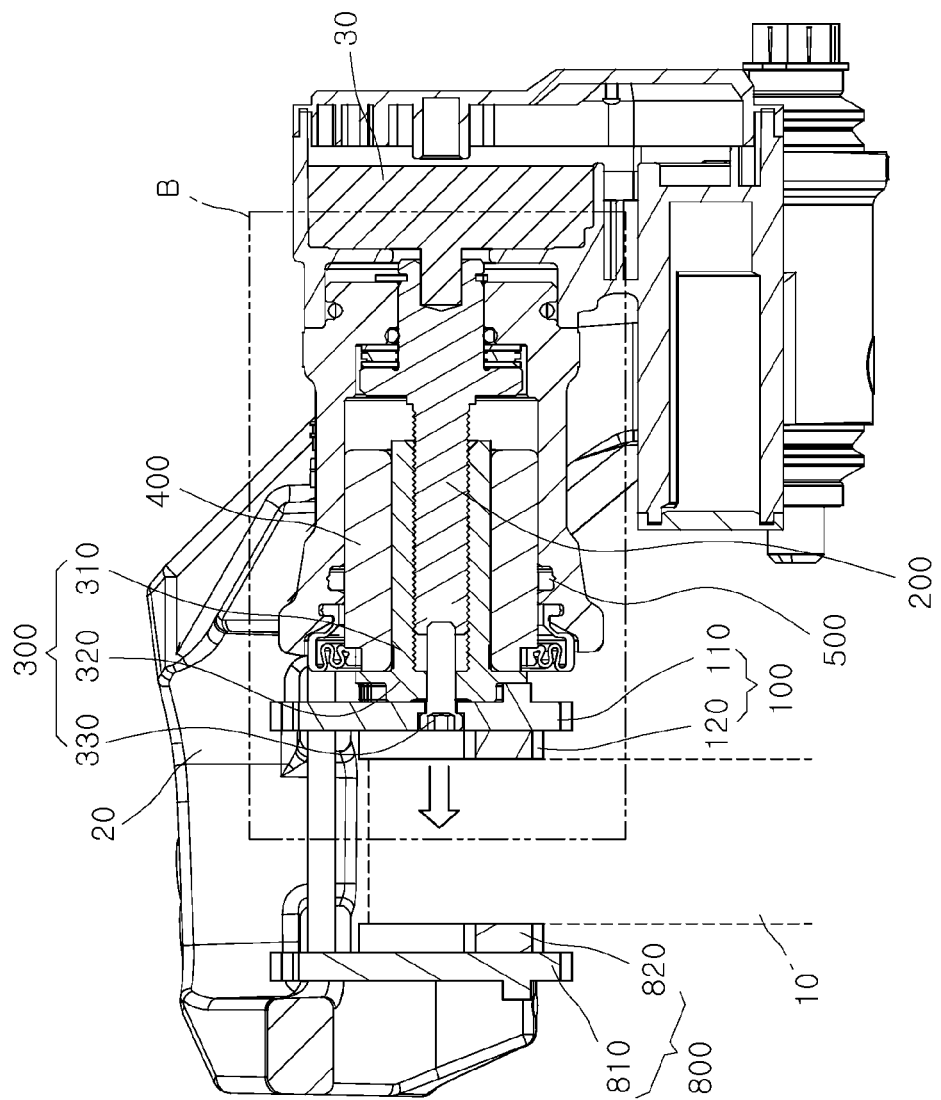
FIG. 5 is a cross-sectional view illustrating that a spindle, a piston and a brake pad of the brake apparatus for a vehicle in accordance with the embodiment of the present disclosure press a brake disk.
Figure 6:
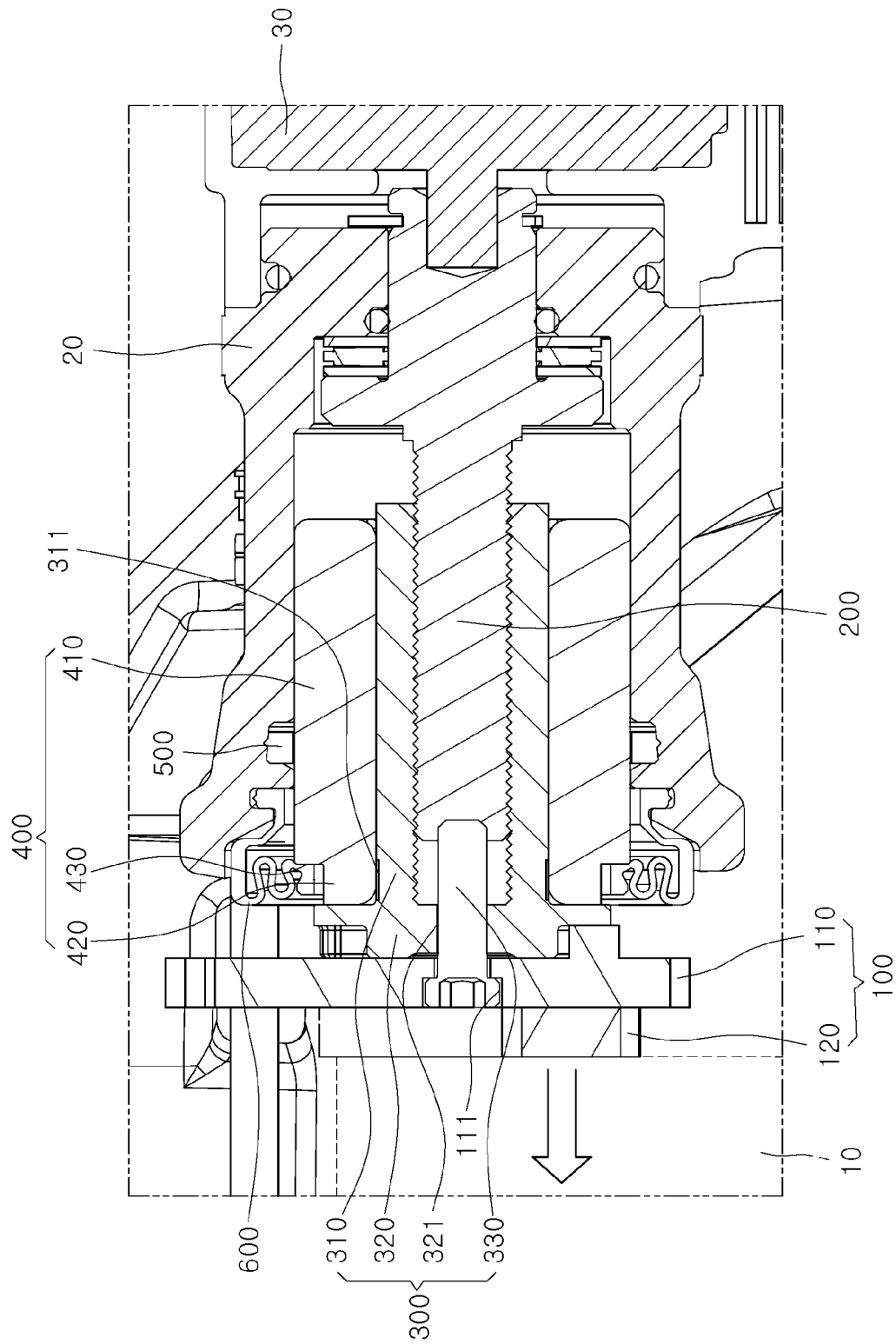
FIG. 6 is an expanded view of a portion B of FIG. 5.
Figure 7:
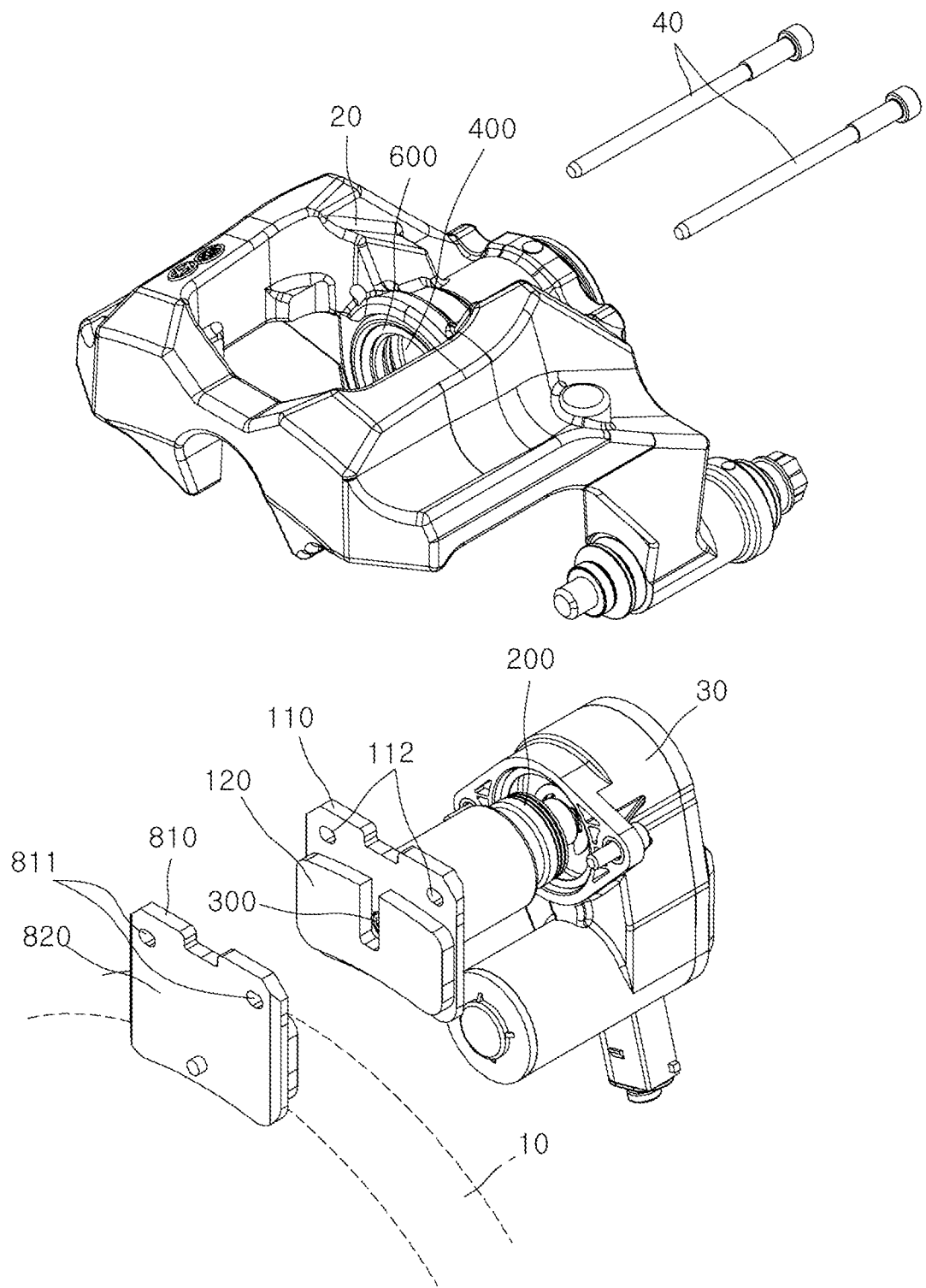
FIG. 7 is an exploded perspective view illustrating the brake apparatus for a vehicle in accordance with the embodiment of the present disclosure.
Figure 8:
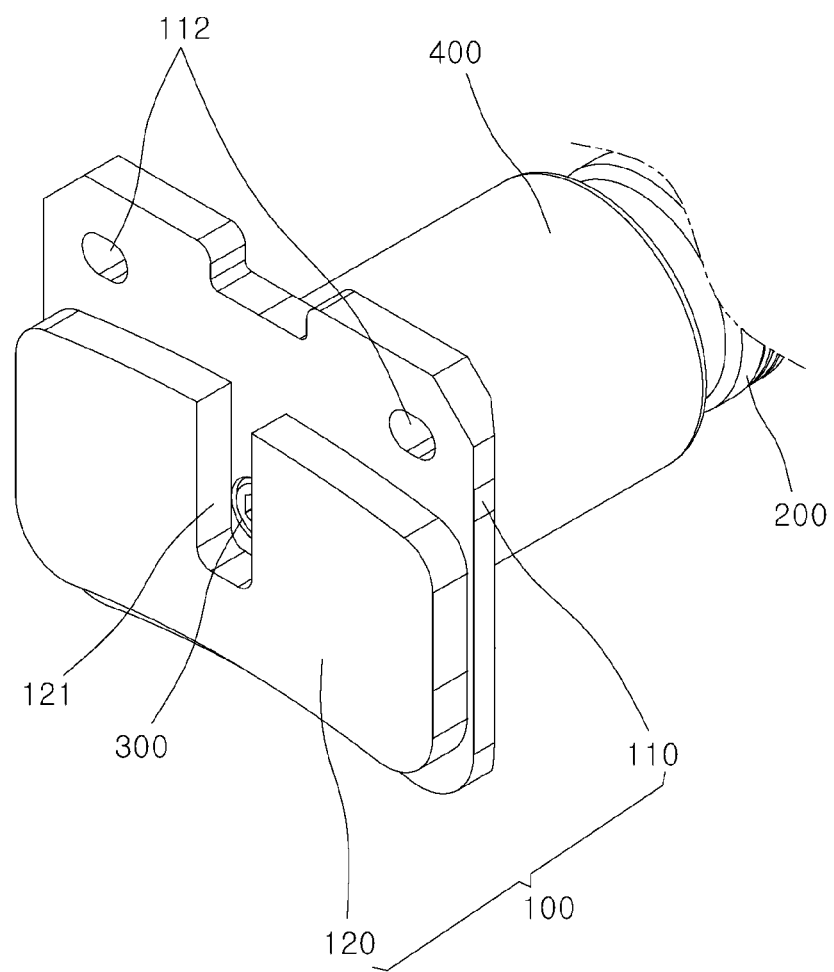
FIG. 8 is an expanded view illustrating main parts of FIG. 7.
Figure 9:
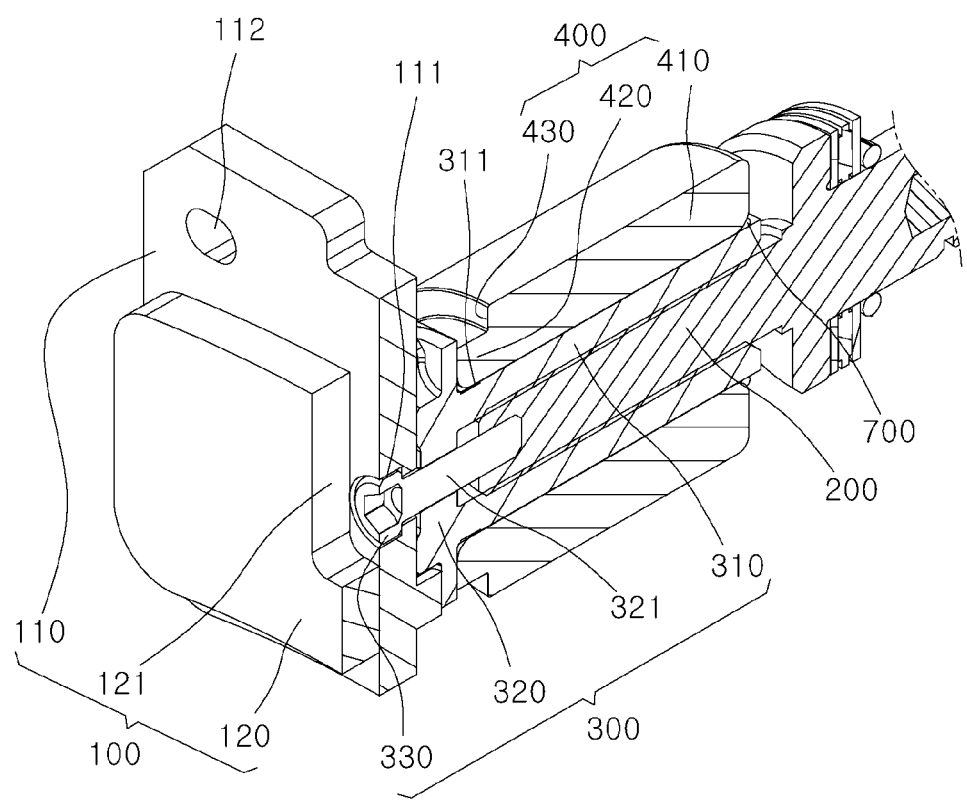
FIG. 9 is a half cross-sectional view of FIG. 8.
Figure 10:
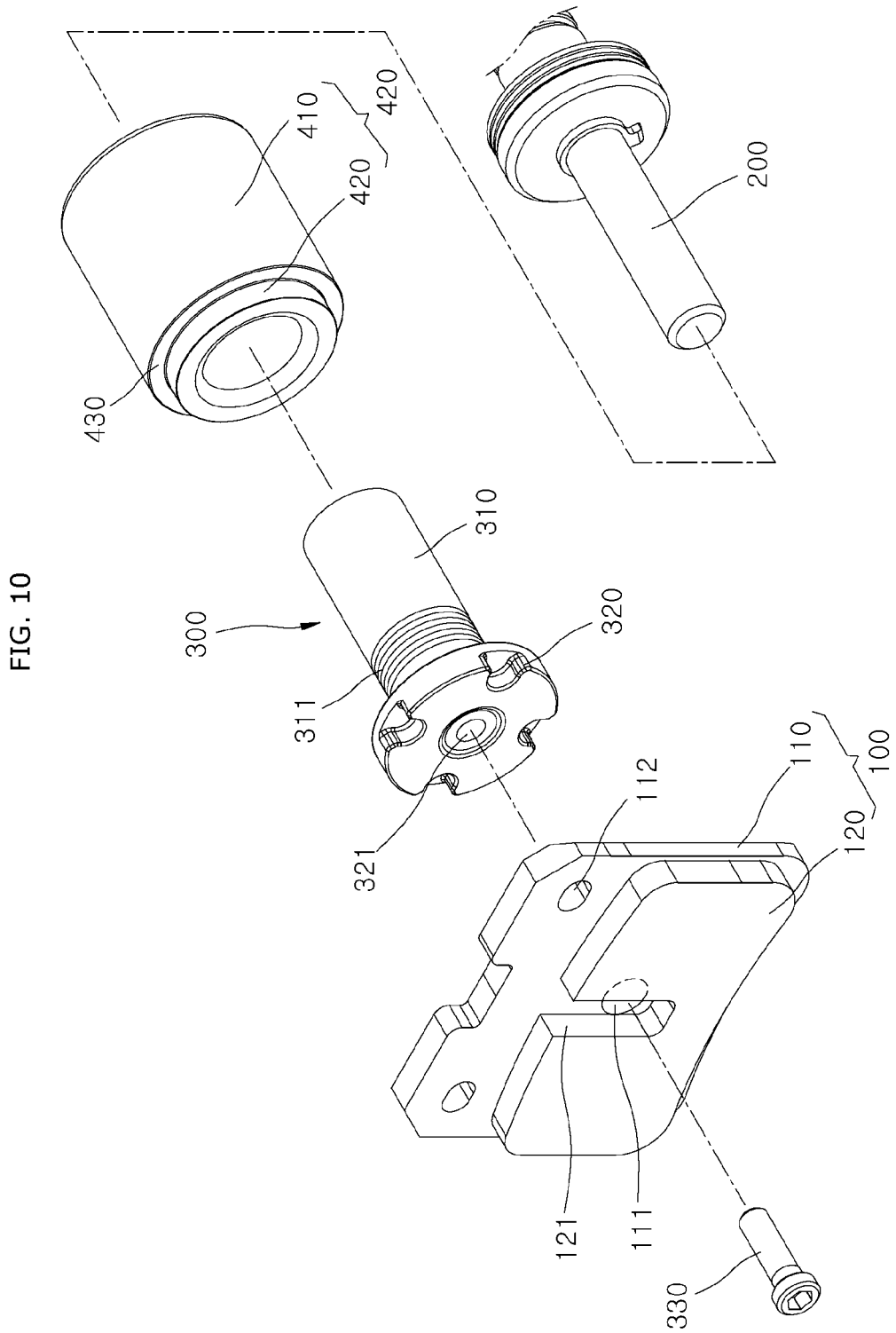
FIG. 10 is an exploded perspective view of FIG. 8.

FIG. 1 is a perspective view illustrating a brake apparatus for a vehicle in accordance with an embodiment of the present disclosure, FIG. 2 is a cross-sectional perspective view illustrating the brake apparatus for a vehicle in accordance with the embodiment of the present disclosure, FIG. 3 is a cross-sectional view illustrating the brake apparatus for a vehicle in accordance with the embodiment of the present disclosure, FIG. 4 is an expanded view of a portion A of FIG. 3, FIG. 5 is a cross-sectional view illustrating that a spindle, a piston and a brake pad of the brake apparatus for a vehicle in accordance with the embodiment of the present disclosure press a brake disk, FIG. 6 is an expanded view of a portion B of FIG. 5, FIG. 7 is an exploded perspective view illustrating the brake apparatus for a vehicle in accordance with the embodiment of the present disclosure, FIG. 8 is an expanded view illustrating main parts of FIG. 7, FIG. 9 is a half cross-sectional view of FIG. 8, and FIG. 10 is an exploded perspective view of FIG. 8.

Referring to FIGS. 1 to 10, a brake apparatus 1 for a vehicle in accordance with an embodiment of the present disclosure includes a brake pad 100, a screw bar 200, a spindle 300, a piston 400 and a sealing member 500. The brake pad 100 presses a brake disk 10.

The screw bar 200 is located in a caliper body 20, and rotated by power received from a motor unit 30. The motor unit 30 includes a motor and a plurality of gears, which are not illustrated. Any one of the gears is connected to the motor, and another one of the gears is connected to the screw bar 200. The gears receive a rotational force from the motor, and rotate the screw bar 200. At this time, the screw bar 200 is formed in a rod shape, has a male screw thread (not illustrated) formed on the outside thereof, and is rotated by the rotational force received from the motor. In the present embodiment, the screw bar 200 is illustrated as a lead screw. However, the present disclosure is not limited thereto, but the screw bar 200 may be replaced with a ball screw depending on a situation.

The spindle 300 is linearly moved by the rotation of the screw bar 200, and coupled to the brake pad 100. The spindle 300 has a female screw thread (not illustrated) formed on the inside thereof and engaged with the male screw thread, and the rotation thereof is constrained by the screw bar 200. That is, the spindle 300 may be moved in a side-to-side direction (based on FIGS. 3 to 6) through the rotation of the screw bar 200.

The spindle 300 is constrained from rotating in the rotation direction of the screw bar 200. When receiving a rotational force from the screw bar 200, the spindle 300 is not rotated but linearly moved to move the brake pad 100 in the side-to-side direction (based on FIGS. 3 to 6), such that the brake pad 100 is pressed or not.

Specifically, when the screw bar 200 is rotated in a preset direction, the spindle 300 may also be moved to the left side (based on FIGS. 3 to 6) of the brake pad 100 with the brake pad 100. That is, the spindle 300 may be moved toward the brake disk 10, and generate a braking force by pressing the brake pad 100.

Then, when the screw bar 200 is rotated in the opposite direction of the preset direction, the spindle 300 may also be moved to the right side (based on FIGS. 3 to 6) of the brake pad 100 with the brake pad 100. That is, the spindle 300 may be moved to the opposite side of the brake disk 10 and separated from the brake pad 100 so as not to press the brake pad 100. Then, the braking force may be released. At this time, as the spindle 300 is coupled to the brake pad 100, the brake pad 100 may be completely separated from the brake disk 10 when the braking force is released, which makes it possible to prevent the generation of drag toque.

The piston 400 is coupled to the spindle 300 so as to cover the outside of the spindle 300, made of a material having lower hardness than that of the spindle 300, and moved with the spindle 300. In other words, the brake pad 100 and the piston 400 which presses the brake pad 100 are made of a material having higher hardness than that of the spindle 300. For example, the spindle 300 may be made of steel, and the piston 400 may be made of aluminum having lower hardness than the material of the spindle 300.

The sealing member 500 is installed in the caliper body 20, and contacted with the piston 400. As the sealing member 500, various types of sealing members may be used as long as the sealing members can perform a damping and sealing action. The sealing member 500 is installed in a sealing groove 21 of the caliper body 20 facing the piston 400.

As the piston 400 is made of a material having lower hardness than that of the spindle 300, the entire weight of the piston 400 and the spindle 300 may be reduced, and a power loss of the motor unit 30 may be reduced. Furthermore, the sealing member 500 may normally perform the damping function, and prevent the generation of rattle noise.

The spindle 300 includes a spindle body 310, a spindle contact part 320 and a coupling part 330. The spindle body 310 is engaged and coupled to the screw bar 200, and linearly moved by the rotation of the screw bar 200, and the piston 400 covers the outer surface of the spindle body 310. Specifically, when the screw bar 200 is rotated in the preset direction, the spindle body 310 is moved toward the brake disk 10, while converting the rotational motion of the screw bar 200 into a linear motion. On the contrary, when the screw bar 200 is rotated in the opposite direction of the preset direction, the spindle body 310 is moved to the opposite side of the brake disk 10.

The spindle contact part 320 is connected to the spindle body 310, and contacted with the brake pad 100. The spindle contact part 320 is formed in a plate shape and contacted with the brake pad 100.

The coupling part 330 couples the spindle contact part 320 and the brake pad 100. The coupling part 330 couples the spindle contact part 320 and the brake pad 100 to each other through a bolt.

The spindle body 310 may have an outer diameter equal to the inner diameter of the piston 400. The spindle body 310 has a serration part 311 formed on the outer surface thereof. Thus, the spindle body 310 may be reliably fitted and coupled into the piston 400.

The piston 400 includes a first piston portion 410 and a second piston portion 420. The first piston portion 410 is coupled to the spindle body 310. The second piston portion 420 is connected to the first piston portion 410 coupled to the spindle body 310, and has a smaller outer diameter than that of the piston 400. The level difference between the first piston portion 410 and the second piston portion 420 forms a boot coupling groove 430.

The brake apparatus 1 for a vehicle further includes a boot part 600. The boot part 600 is mounted on the caliper body 20 and coupled to the boot coupling groove 430. The boot part 600 has one end mounted in a boot groove 22 of the caliper body 20 and the other end mounted in the boot coupling groove 430.

As the boot coupling groove 430 is formed by the level difference between the first piston portion 410 and the second piston portion 420, a separate processing groove does not need to be formed in order to mount the boot part 600 on at least one of the spindle 300 and the piston 400. Thus, the manufacturing process may be simplified to reduce the manufacturing time.

In the present disclosure, it has been described that the boot coupling groove 430 is formed by the level difference between the first piston portion 410 and the second piston portion 420. However, the present disclosure is not limited thereto, but the design thereof may be changed so that a groove in which the boot part 600 is mounted is formed by the level difference between the spindle contact part 320 and the piston 400, depending on a situation.

The brake pad 100 includes a back plate 110 and a friction member 120. The back plate 110 is coupled to the spindle contact part 320 by the coupling part 330, and disposed on one side of the brake disk 10. The back plate 110 is moved with the spindle contact part 320 toward the brake disk 10 or to the opposite side of the brake disk 10. At this time, the back plate 110 is fastened to the caliper body 20 by a pin member 40. The pin member 40 is fastened to the caliper body 20 through a first fastening hole 112 of the back plate 110.

The friction member 120 is coupled to the back plate 110. The friction member 120 may be made of an elastic material, and press one side of the brake disk 10. The friction member 120 is coupled to a surface of the back plate 110, facing the brake disk 10.

The back plate 110 has a first coupling hole 111 to which the coupling part 330 is screwed, and the spindle contact part 320 has a second coupling hole 321 which faces the first coupling hole 111 and to which the coupling part 330 is screwed.

The first coupling hole 111 is formed in the center of the back plate 110, and the friction member 120 has a coupling groove 121 formed in a portion facing the center of the back plate 110.

The piston 400 has a rounded corner 400a which is contacted with the spindle contact part 320, and an O-ring 700 is inserted between the rounded corner 400a and the spindle contact part 320. Thus, such a structure can prevent foreign matters from flowing into the gap between the piston 400 and the spindle contact part 320, due to the tolerances of the piston 400 and the spindle contact part 320, and the piston 400 and the spindle contact part 320 may be reliably coupled to each other.

A second brake pad 800 includes a second back plate 810 and a second friction member 820. The second back plate 810 is coupled to the caliper body 20, and disposed on the other side of the brake disk 10. The second back plate 810 is coupled to the caliper body 20 so as to face the brake pad 100. The second back plate 810 is fastened to the caliper body 20 by the pin member 40. Specifically, the pin member 40 is coupled to the caliper body 20 through a second fastening hole 811 of the second back plate 810.

The second friction member 820 is coupled to the second back plate 810, and contacted with the brake disk 10. The second friction member 820 may be made of an elastic material, and contacted with the other side of the brake disk 10. The second friction member 820 is coupled to a surface of the second back plate 810, facing the brake disk 10.

Figure 11:
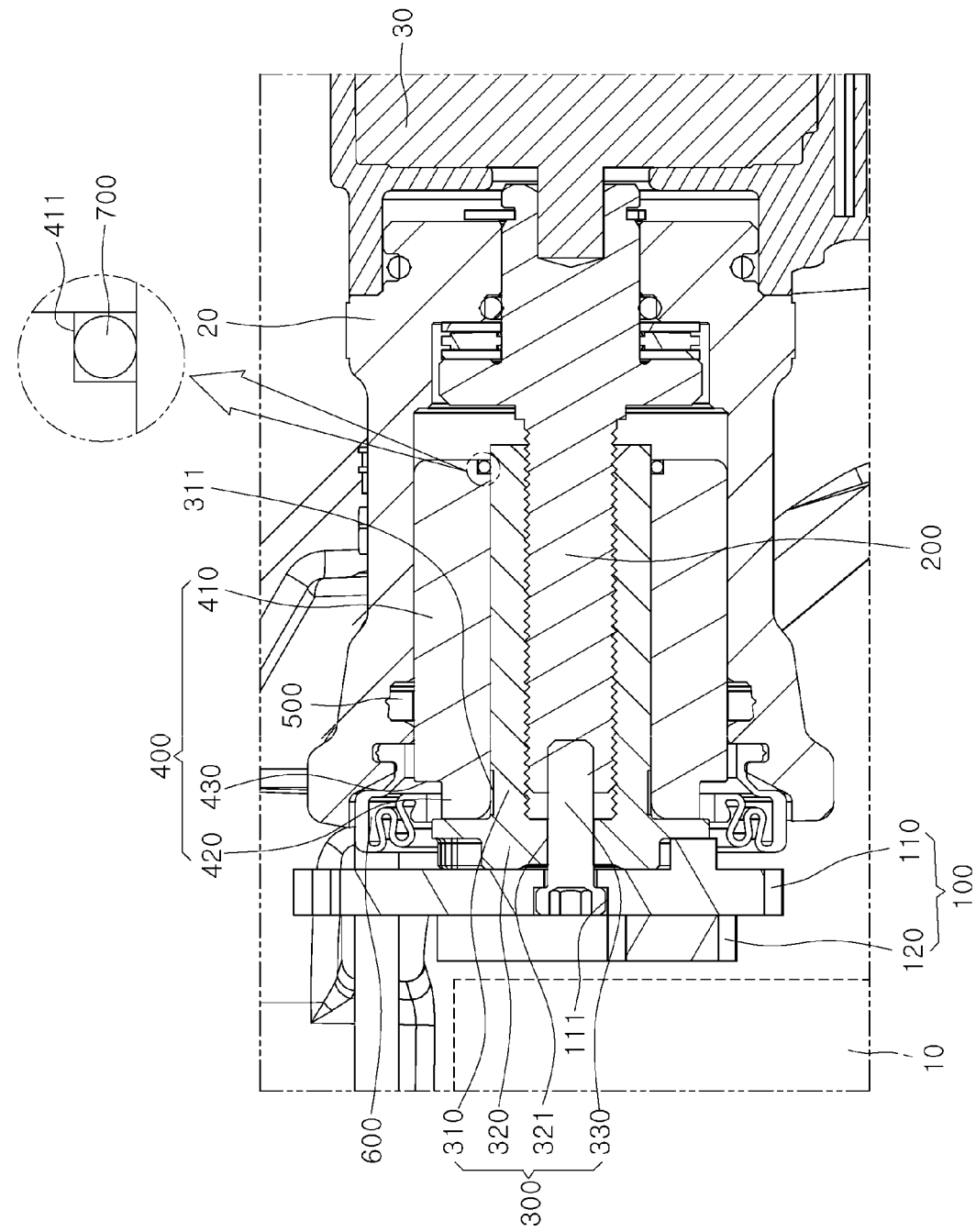
FIG. 11 is a cross-sectional view illustrating a brake apparatus for a vehicle in accordance with another embodiment of the present disclosure.

FIG. 11 is a cross-sectional view illustrating a brake apparatus for a vehicle in accordance with another embodiment of the present disclosure. Hereafter, the brake apparatus for a vehicle in accordance with the another embodiment of the present disclosure will be described. At this time, the detailed descriptions of the same contents of the another embodiment as those of the above-described embodiment will be omitted herein.

The piston 400 has an O-ring coupling groove 411 formed at a portion contacted with the spindle contact part 320, and the O-ring 700 is inserted into the O-ring coupling groove 411. Thus, such a structure can prevent foreign matters from flowing into the gap between the piston 400 and the spindle contact part 320, due to the tolerances of the piston 400 and the spindle contact part 320, and the piston 400 and the spindle contact part 320 may be reliably coupled to each other.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
  a brake pad configured to press a brake disk, the brake pad including a back plate and a friction member coupled to the back plate, the back plate having a first coupling hole formed in a center of the back plate and the friction member having a coupling groove formed in a portion facing the center of the back plate;
  a screw bar located in a caliper body, and rotatable by power received from a motor unit;
  a spindle linearly movable by rotation of the screw bar, and coupled to the brake pad, the spindle including:
    a spindle contact part configured to contact the brake pad; and
    a coupling part configured to pass through the coupling groove of the friction member and be inserted into the first coupling hole formed on the center of the back plate and a second coupling hole formed on the spindle contact part to couple the back plate and the spindle contact part without directly coupling the friction member and the spindle contact part, wherein the first coupling hole and the second coupling hole are aligned facing each other so that the coupled brake pad and spindle linearly move together and the screw bar is inserted into the spindle and is aligned with the first coupling hole and the second coupling hole;
  a piston coupled to the spindle so as to cover an outside of the spindle, made of a material having lower hardness than that of the spindle, and movable with the spindle; and
  a sealing member installed in the caliper body, and contacting the piston.

2. The brake apparatus of claim 1, wherein the spindle comprises:
  a spindle body engaged and coupled to the screw bar, linearly movable by the rotation of the screw bar, and having an outer surface covered by the piston; and
  the spindle contact part is further configured to be connected to the spindle body.

3. The brake apparatus of claim 2, wherein the spindle body has a serration part formed on an outer surface thereof.

4. The brake apparatus of claim 2, wherein the piston comprises:

a first piston portion coupled to the spindle body; and a second piston portion connected to the first piston portion coupled to the spindle body, and having an outer diameter smaller than an outer diameter of the first piston portion, wherein a boot coupling groove is formed by a level difference between the first piston portion and the second piston portion.

5. The brake apparatus of claim 4, further comprising a boot part mounted on the caliper body and coupled to the boot coupling groove.

6. The brake apparatus of claim 2, wherein the piston has a rounded corner contacting the spindle contact part, wherein an O-ring is inserted between the rounded corner and the spindle contact part.

7. The brake apparatus of claim 2, wherein the piston has an O-ring coupling groove formed at a portion contacting the spindle contact part, wherein an O-ring is inserted into the O-ring coupling groove.

\* \* \* \* \*